US007240294B2

(12) United States Patent
Fitzsimons et al.

(10) Patent No.: US 7,240,294 B2
(45) Date of Patent: Jul. 3, 2007

(54) METHOD OF CONSTRUCTING A COMPOSITE IMAGE

(75) Inventors: Edgar Michael Fitzsimons, New York, NY (US); Brian G. Fitzsimons, Short Hills, NJ (US); Erik Richard Langenbach, Croton Falls, NY (US)

(73) Assignee: DeskNet Inc., Jersey City, NJ (US)

( * ) Notice: Subject to any disclaimer, the term of this patent is extended or adjusted under 35 U.S.C. 154(b) by 238 days.

(21) Appl. No.: 09/932,517

(22) Filed: Aug. 17, 2001

(65) Prior Publication Data

US 2003/0034991 A1 Feb. 20, 2003

Related U.S. Application Data

(60) Provisional application No. 60/241,661, filed on Oct. 20, 2000.

(51) Int. Cl.
*G06F 3/00* (2006.01)

(52) U.S. Cl. ............... 715/788; 715/760; 715/782; 715/800; 715/848; 715/513; 715/517; 715/520

(58) Field of Classification Search ............ 345/788, 345/798–801, 835–838, 762–763, 760, 769; 715/513, 517–521, 515, 523, 782, 848, 852, 715/788, 760, 798–801, 835–838, 762–763, 715/769; 705/26
See application file for complete search history.

(56) References Cited

U.S. PATENT DOCUMENTS 5,119,465 A 6/1992 Jack

| 5,608,874 A | 3/1997 | Ogawa |
| 5,655,130 A | 8/1997 | Dodge |
| 5,845,299 A | 12/1998 | Arora et al. |
| 5,911,776 A | 6/1999 | Guck |
| 5,915,259 A | 6/1999 | Murata |
| 6,097,389 A | 8/2000 | Morris et al. |
| 6,275,829 B1 | 8/2001 | Angiulo et al. |
| 6,331,858 B2 * | 12/2001 | Fisher ................. 345/582 |
| 6,657,647 B1 * | 12/2003 | Bright ................. 345/856 |
| 6,684,369 B1 * | 1/2004 | Bernardo et al. ........ 715/513 |
| 6,727,925 B1 * | 4/2004 | Bourdelais ............. 345/852 |
| 2002/0023111 A1 * | 2/2002 | Arora et al. ........... 707/513 |
| 2002/0046245 A1 * | 4/2002 | Hillar et al. ........... 709/205 |
| 2002/0063736 A1 * | 5/2002 | Sugimoto .............. 345/762 |

(Continued)

OTHER PUBLICATIONS

Patent Cooperation Treaty International Search Report, dated Jun. 20, 2002.

(Continued)

*Primary Examiner*—Sy D. Luu
(74) *Attorney, Agent, or Firm*—Morgan & Finnegan, L.L.P.

(57) ABSTRACT

A method and apparatus are provided for constructing a composite image within an image space of a webpage. The method includes the steps of displaying a plurality of source images within a content area of the webpage and dividing the image space of the composite image into a plurality of subspaces. The method further includes the steps of designating a10 subspace of the plurality of subspaces for receipt of a selected image of the plurality of images and resizing the selected image to fit the designated subspace of the composite image.

39 Claims, 17 Drawing Sheets

U.S. PATENT DOCUMENTS

2002/0078097 A1* 6/2002 Chen et al. .................. 707/517
2002/0152245 A1* 10/2002 McCaskey et al. ......... 707/530
2002/0188632 A1* 12/2002 Su .............................. 707/513
2002/0188635 A1* 12/2002 Larson ........................ 707/515
2003/0101412 A1* 5/2003 Eid ............................. 715/513

OTHER PUBLICATIONS

"Methodology for Specifying a Document Transformation Override in a Sender Transform Implementation", IBM TDB vol. 34 No. 9, pp. 196-197, Feb. 1, 1992.

* cited by examiner

10

METHOD OF CONSTRUCTING A COMPOSITE IMAGE

This application claims the benefit of U.S. Provisional Application No. 60/241,661, filed Oct. 20, 2000.

FIELD

The field of the invention relates to the Internet and more specifically to method of constructing and transmitting images over the Internet.

BACKGROUND

Computer networks, in general, and the Internet, in specific, have become a vast resource of information. With the aid of a personal computer (PC) and web browser, a user may connect and retrieve information on virtually any subject matter.

Using the browser, a user can locate and access any of a number of search engines through the Internet. From the search engines, a webpage may be downloaded for the entry of search terms. Through the proper entry of search terms, any range of images and text may be located and downloaded to a user.

Once downloaded to a user, the user may review the information on-line or print it out. Alternatively, the user may store the information to disk.

While the information downloaded from the Internet is useful, it typically downloaded under a hypertext transport protocol (HTTP). While HTTP is useful for storing and printing, it is not particularly easy to manipulate and combine files. Other protocols, such as XML, are available, but have not been developed into useful applications. Accordingly, a need exists for applications which allow for the easy manipulation and combining of web based documents.

SUMMARY

A method and apparatus are provided for constructing a composite image within an image space of webpage. The method includes the steps of displaying plurality of source images within a content area of the webpage and dividing the image space of the composite image into a plurality of subspaces. The method further includes the steps of designating a subspace of the plurality of subspaces for receipt of a selected image of the plurality of images and resizing the selected image to fit the designated subspace of the composite image.

Figure 1:
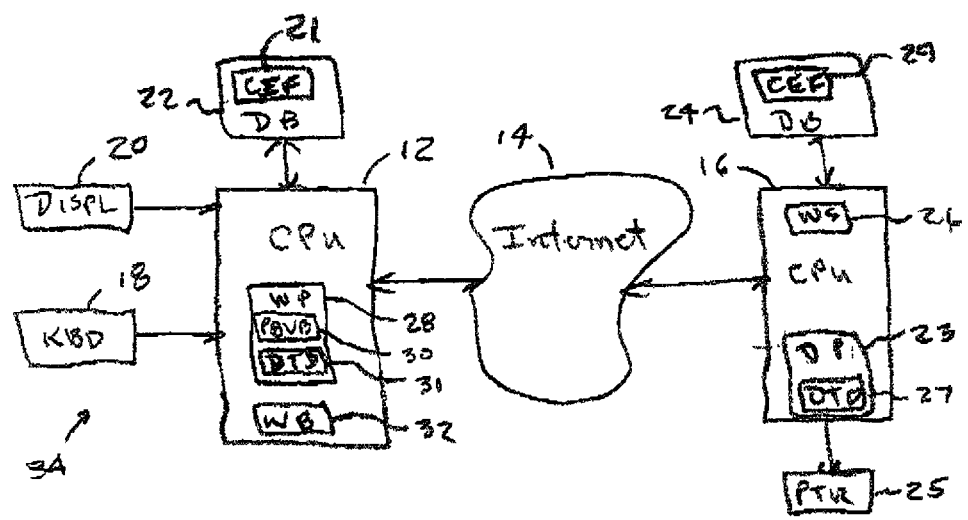
FIG. 1 is a block diagram of a system for constructing a composite image in accordance with an illustrated embodiment of the invention.

Appendix I depicts a DTD that may be used by the system of FIG. 1.

Figure 17:
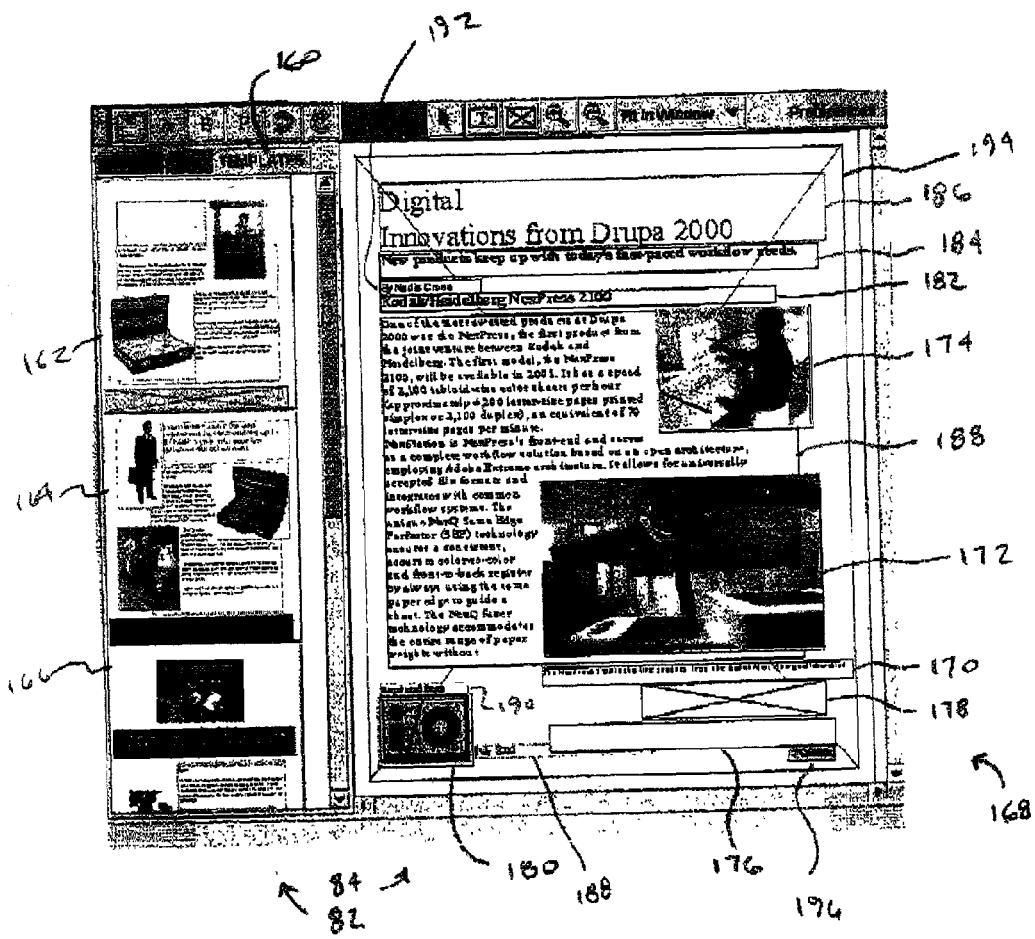
FIG. 17 depicts a screen for editing composite images that may be used by the system of FIG. 1.

Appendix II depicts a composite image file that may be generated from the composite image of FIG. 17.

DETAILED DESCRIPTION

FIG. 1 is a block diagram of a system 10, shown generally under an illustrated embodiment of the invention, for collecting, composing and transmitting images through the Internet. As used herein, an image includes: an illustration; photo; text; multimedia components such as, but not limited to, video, hypertext, etc.; and/or the like. A composite image includes more than one image.

Included within the system 10 may be an operators station 34. The operators station 34 may include a central processing unit (CPU) 12 with an appropriate web browser 32, a display 20 and keyboard 18. The operators station 34 may also include a database 22 which may function as a source and also a destination of images.

The operators station 34 may include a connection to the Internet 14. Also coupled to the Internet 14 may be one or more servers (e.g., CPUs) 16, including websites 26 and databases 24. The servers 16 may also function as both a source and destination of images as described in more detail below.

Under the illustrated embodiment, an operator (not shown) working through the operators station 34 may access a website 26 and download a webpage 28 containing the software constructs (e.g., a page building via browser (PBVB) tool 30) for processing composite images. The PBVB tool 30 is a configurable tool, which brings page layout functionality to the Internet. Communication between the operators station 34 and website 26 for downloading of the P3VB tool 30 (and subsequent communication) may occur through the standard HTTP port 80 of the operators station 34.

As described in more detail below, the PBVB tool 30 provides a facility and an intuitive interface for placing content within a template. Since it may be retrieved from a website, it is inherently simple to access from remote locations and easy to install. Further, since the PBVB tool 30 may be downloaded from a common website of an organization, the organization may more easily enforce business rules through the use of embedded templates.

In general, the PBVB 30 may be written as a Java applet and run inside the browser 32. Providing the PBVB 30 as a Java applet allows PBVB 30 to be easily used in conjunction with Microsoft Internet Explorer or Netscape Navigator browsers on either PC or Macintosh platforms.

Further, to facilitate operation of the PBVB 30, data may be delivered to and routed from the PBVB 30 under a common format (e.g., XML). The use of XML simplifies image manipulation and composite image construction by providing a format which is Internet compatible and which is easily adapted to both text and image processing.

The preparation of composite images may be useful for any of a number of uses. For example, the operator may use the workstation 34 to retrieve text and graphical representations from any of a number of Internet or local sources and combine such information into virtually any form of instructional or sales literature (e.g., catalogs).

Following is a description of a process that may be used for the creation of a catalog. While the description below is directed to a specific type of composite image, it should be understood that the described process may be extended to virtually any situation.

Figure 2:
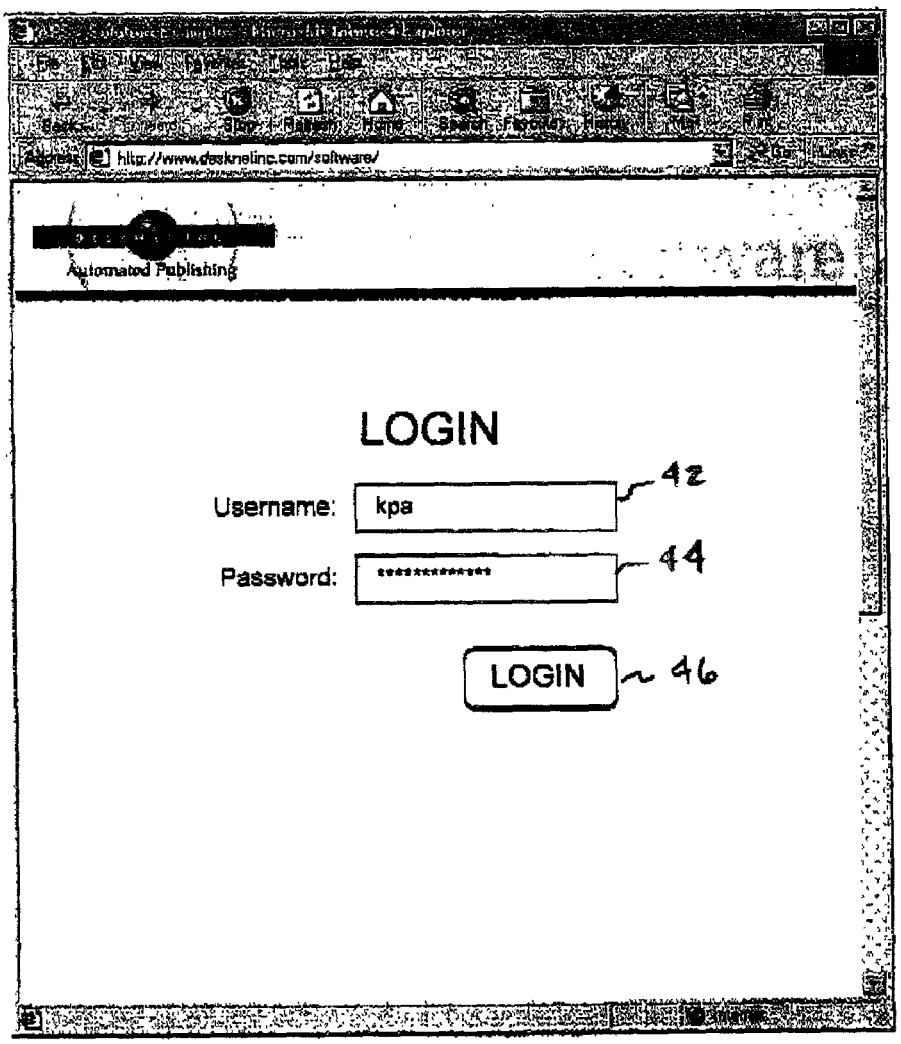
FIG. 2 is login screen that may be used by the system of FIG. 1.

In order to perform construction of a composite image, the operator (after accessing the website 26 and downloading webpage 28 and PBVB 30) may first be presented with a sign-on screen 40 (FIG. 2). The operator may enter his user name in a first box 42 and password in a second box 44, followed by activation of a login softkey.

Figure 3:
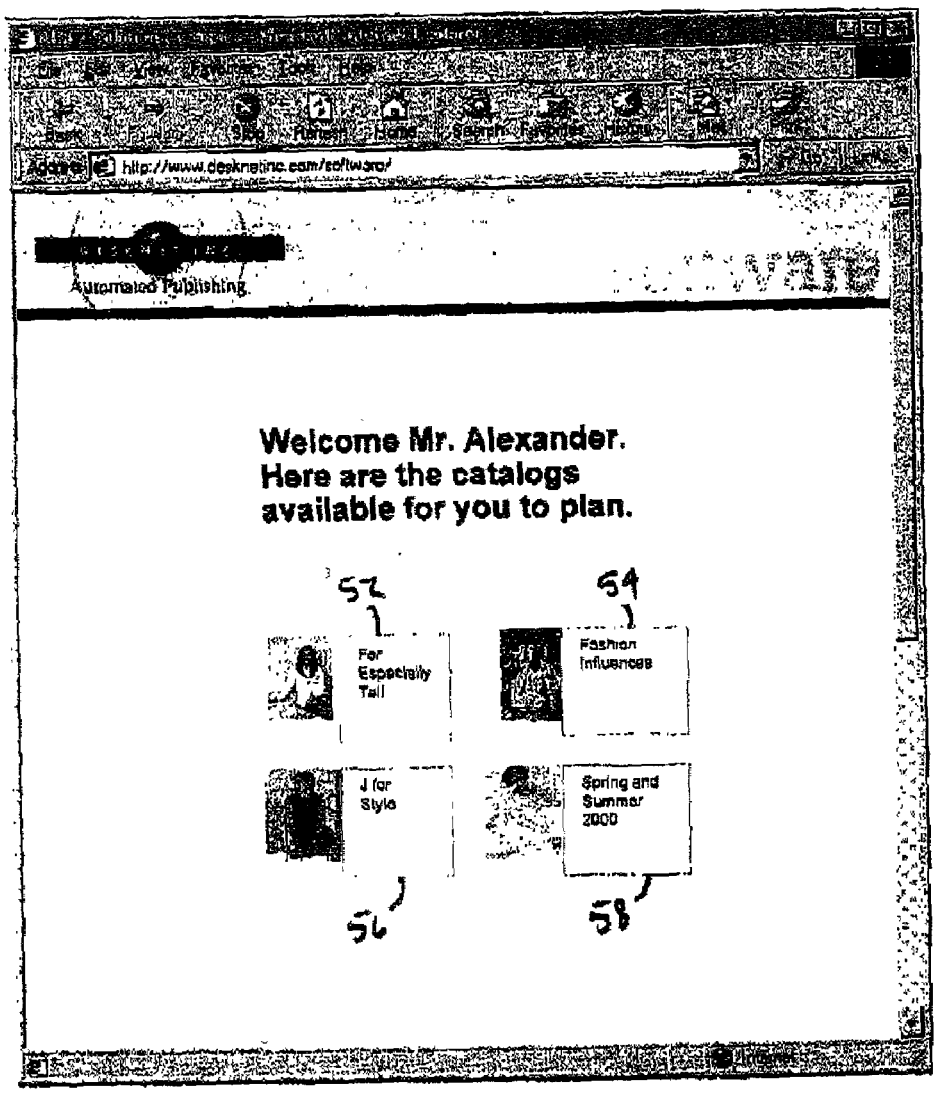
FIG. 3 is a subject matter selection screen that may be used by the system of FIG. 1.
Figure 4:
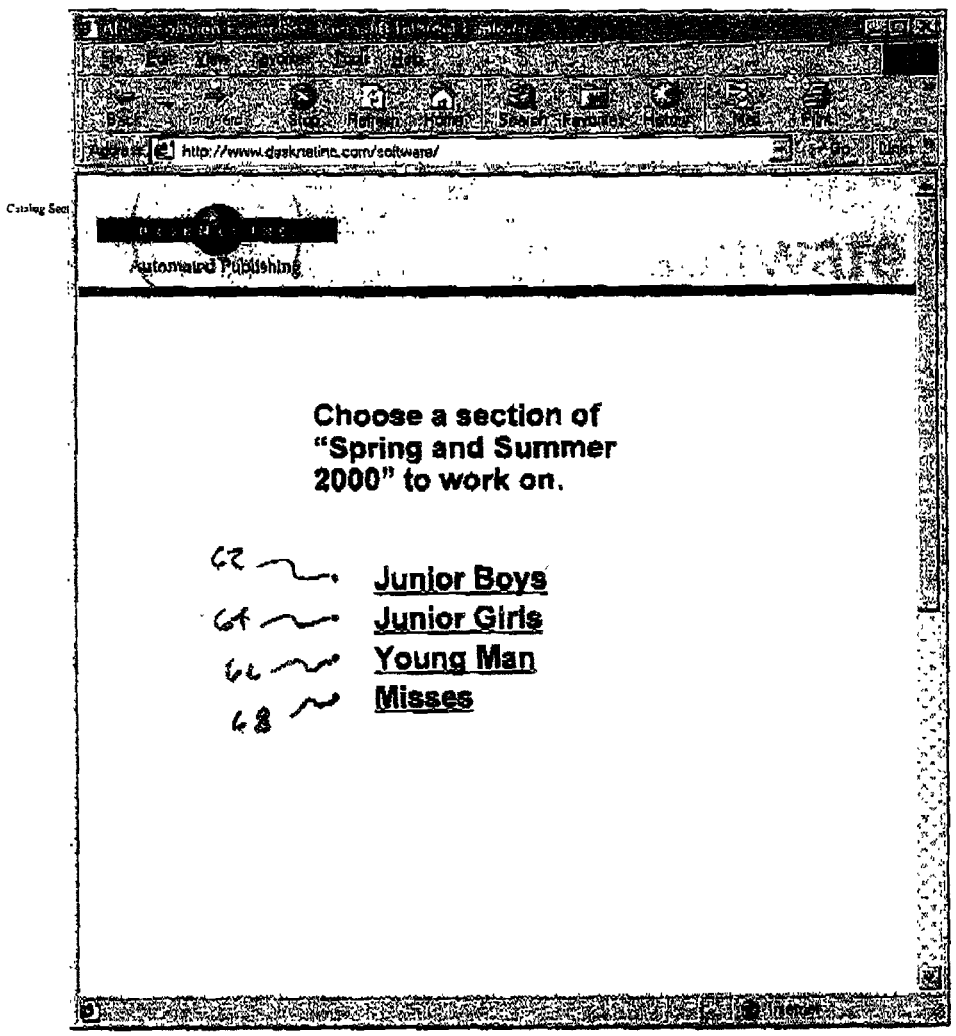
FIG. 4 depicts a further subject matter selection screen that may be used by the system of FIG. 1.
Figure 5:
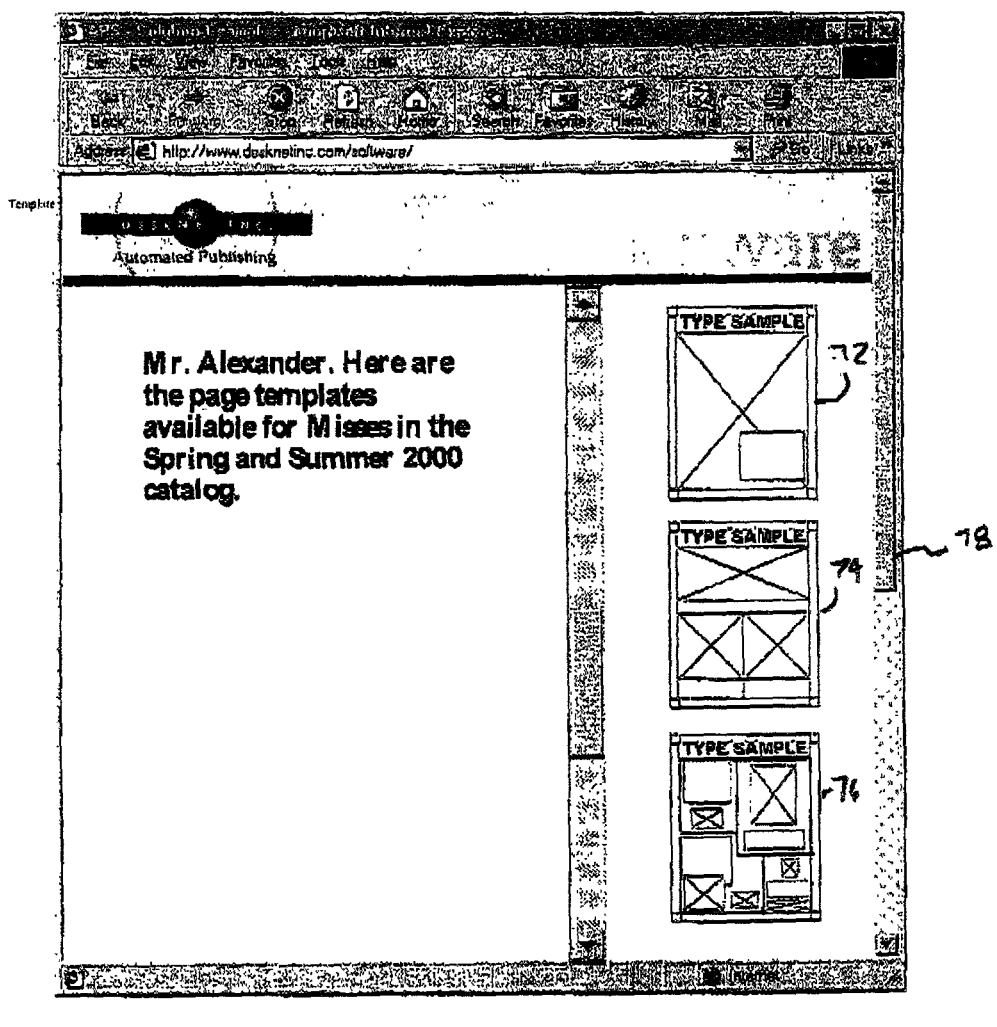
FIG. 5 depicts a template selection screen that maybe used by the system of FIG. 1.

Following sign-in to the system, the website 26 may download a webpage 50 (FIG. 3) offering a set of file choices 52, 54, 56, 58 from which the composite images will be created. In the example of the catalog, the operator may activate the "Spring and Summer" option 58.

In response, a further webpage 60 may be downloaded from the website offering subdivisions 62, 64, 66, 68 of the file selection 58. As a further example of the catalog creation, the operator may select "Misses" 68.

In response, the website 26 may download a template selection webpage 70. Within the template selection webpage 70, a number of possible templates 72, 74, 76 may be provided, any one of which may be used for creation of a composite image. A scroll bar 78 may be provided to access other choices of templates. In the example provided, the operator may select the lower template 76.

The templates may be divided into a number of boxes. Larger boxes may have smaller boxes inside. The smaller boxes may be text boxes and the larger boxes may be image boxes. For convenience text boxes may be shown with diagonal lines. However, this is for convenience only, in the sense that images may later be placed in text boxes and text placed in image boxes.

Figure 6:
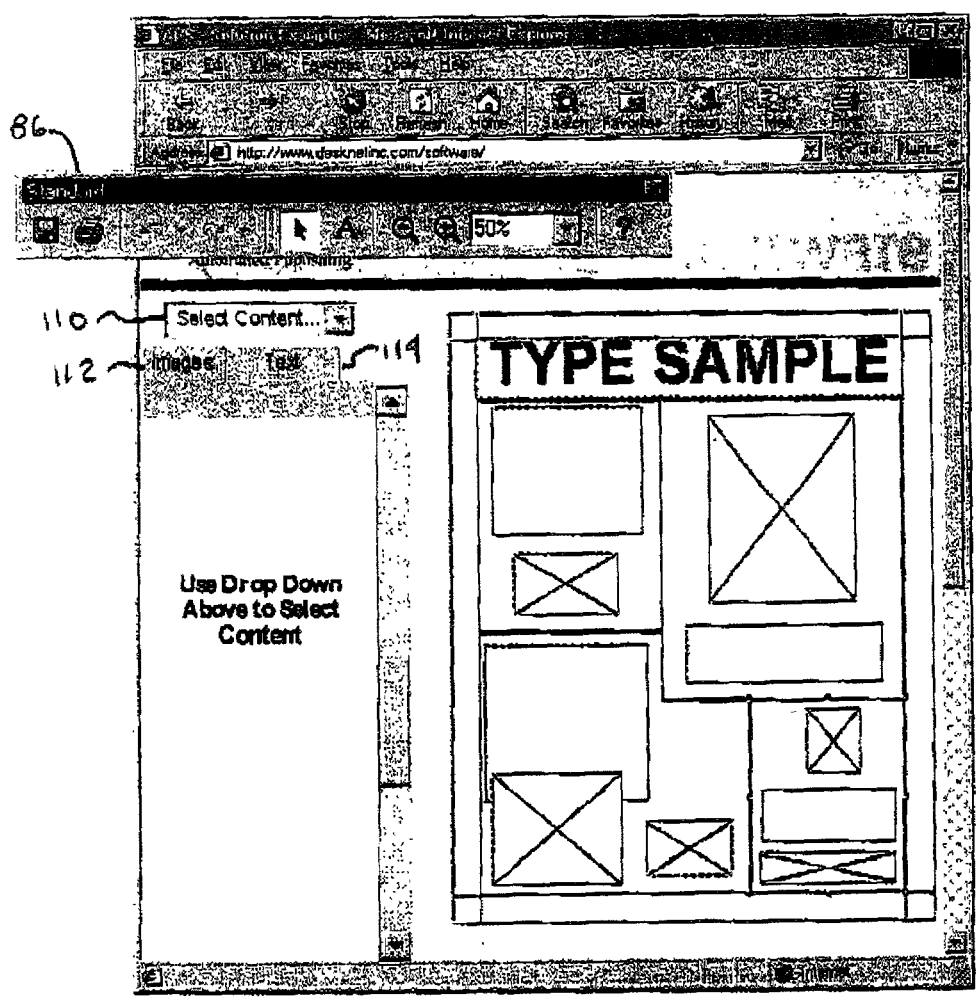
FIG. 6 depicts a selected template and content area that may be used by the system of FIG. 1.

Upon selection of a template 76, the PBVB 30 may divide the display 80 into a composing screen including first and second windows 82, 84 (FIG. 6). The first window 82 may be a content area for selecting source content for the composite image and the second window 84 displays the template within which the composite image is to be created. A floating toolbar 86 is also provided to facilitate creation of the composite image.

Figure 7:
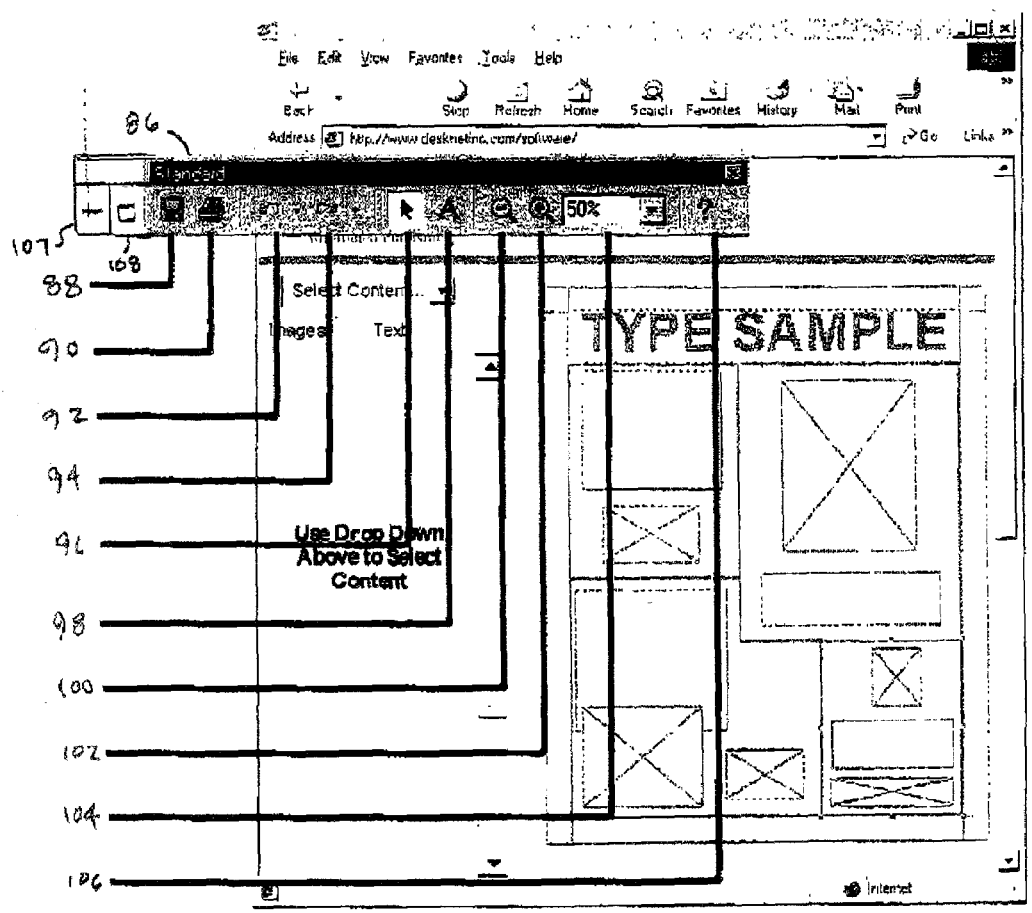
FIG. 7 depicts a floating toolbar that may be used by the system of FIG. 1.

FIG. 7 provides further detail regarding the floating toolbar 86. As shown, a first icon 88 of a disk, allows the user to save the composite image. A second icon 90 allows the user to print the composite image. Third and fourth curved arrows 92, 94 allows the user to UNDO and REDO changes. A selection tool 96 is provided to select specific boxes of the template for insertion of content into the composite image. A text tool 98 is provided to edit text in specific boxes. Zoom-in and zoom-out boxes 100, 102 and a zoom-to-percentage box 104 are provided to enlarge or reduce portions of the composite image. A help box 106 is also provided. Finally, a box select tool 108 and line selection tool 107 are provided to insert additional boxes and lines into the template.

A user may click on the box selection tool 107 with a cursor 134 and then click on a desired location within the selected template. The location of the cursor 134 when the key on the mouse was actuated becomes the upper left corner of a new box. The user may enlarge the box by holding the actuating key on a mouse controller and dragging the new box to whatever size needed.

Similarly, the line tool 107 may be selected by placing the cursor 134 on the line selection icon 107 and clicking. To create lines, the user may first click on a starting position, move the cursor 134 to an end position and click a second time.

The content area 82 functions as a means for accessing source material for inclusion into the composite image. Within the content area 82, a first pull-down menu 110 may specify a data path to a particular data source (e.g., within a local directory, related database 22, Internet source 24, etc.). Once a source has been identified, first and second tabs 112, 114 may be used to select either text or images within the source file.

Figure 8:
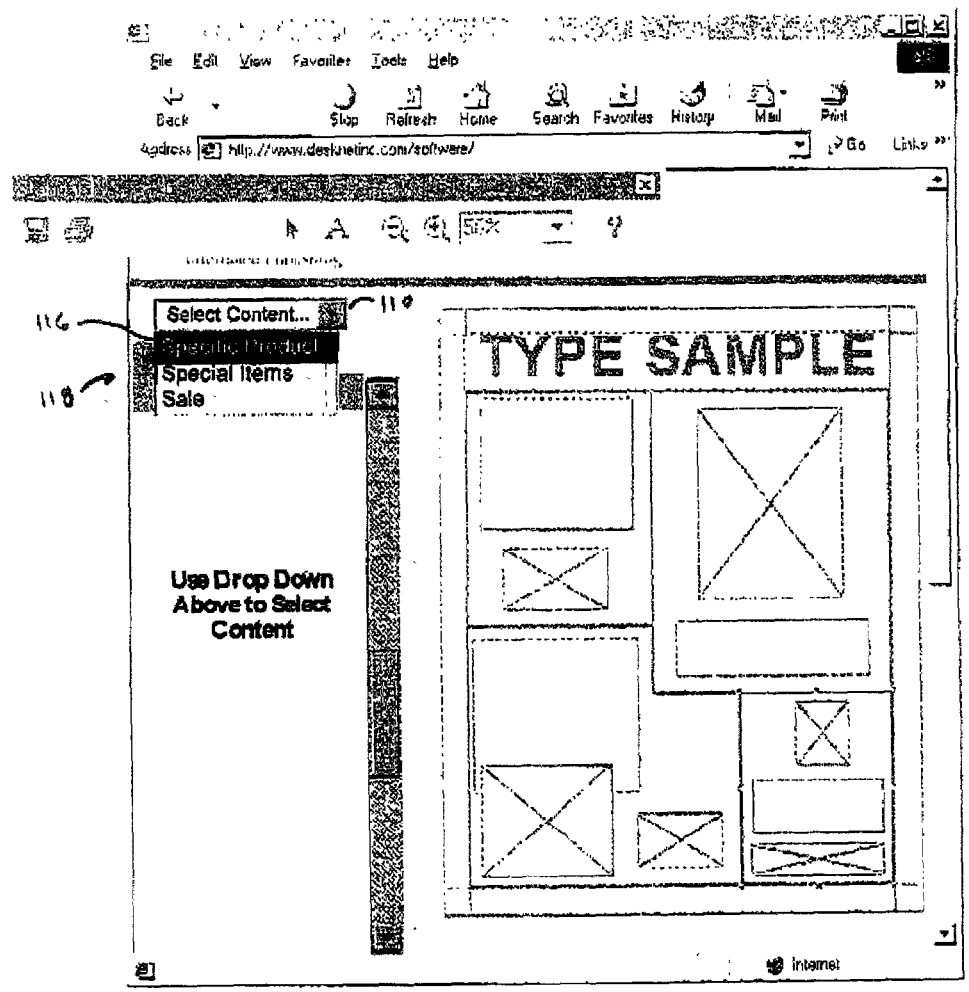
FIG. 8 depicts details of content selection that may be used by the system of FIG. 1.

In the catalog example, a user may specify a specific pathname as a data source within a remote DB 24 (FIG. 1). Files identified by the pathname may be displayed in the pulldown menu 118 (FIG. 8) of content select 110. In the catalog example, the file names may be "Specific Product", "Special Items" and "Sale". The user may select "Specific Product". Some choices may require additional path information.

Figure 9:
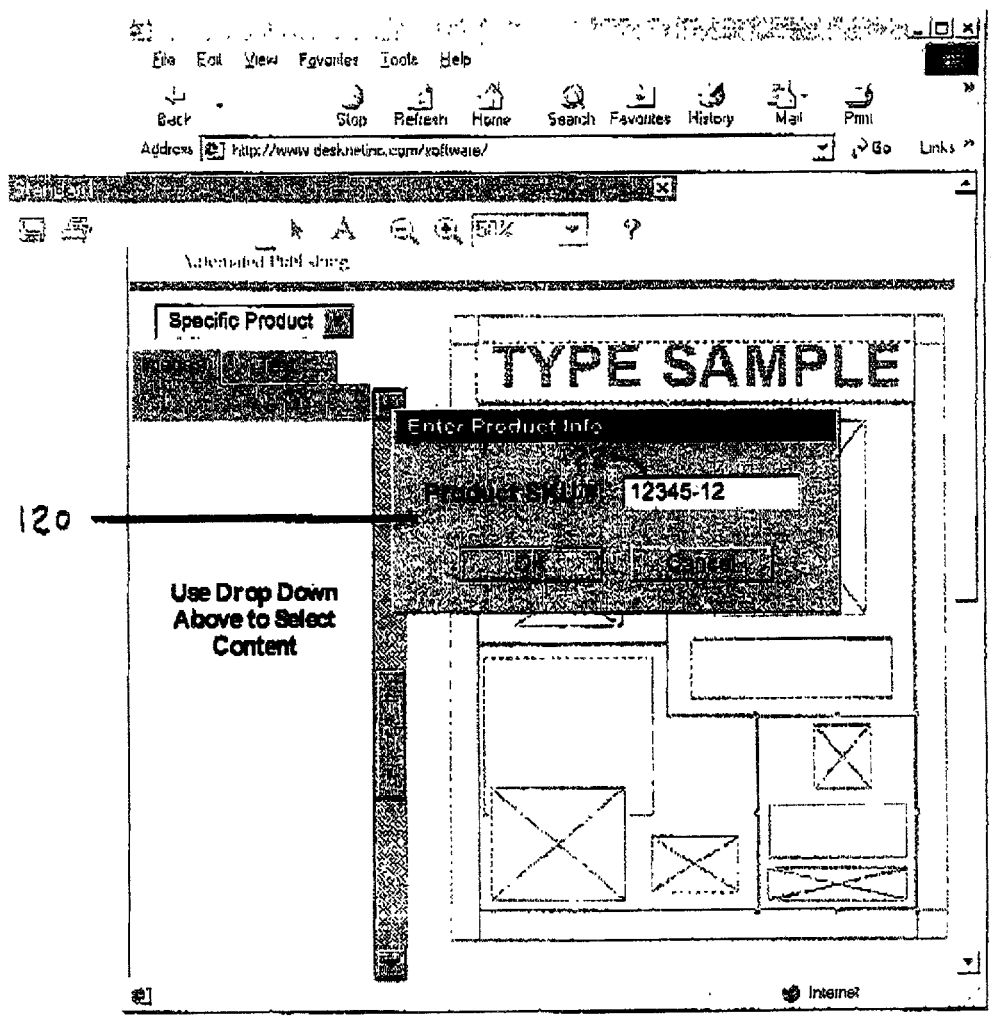
FIG. 9 depicts further details of content selection that may be used by the system of FIG. 1.
Figure 10:
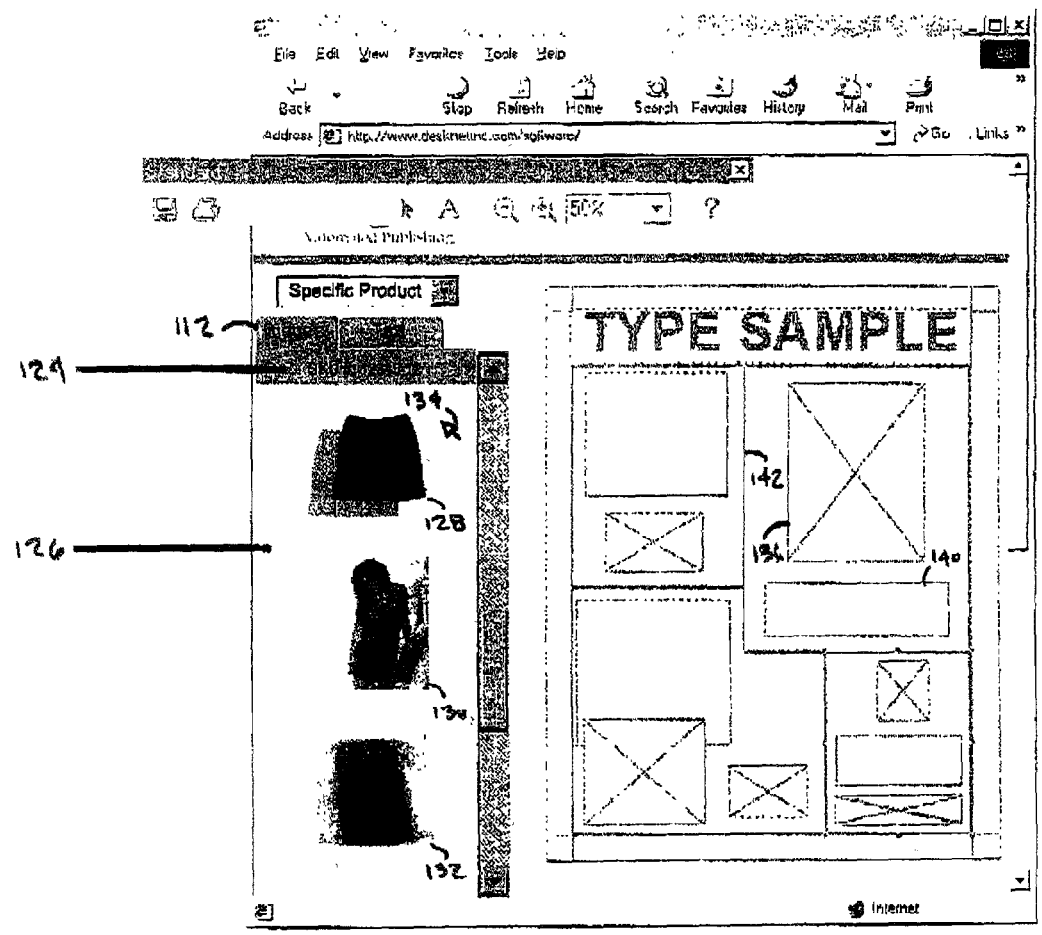
FIG. 10 depicts content that may be used in the composite image by the system of FIG. 1.

For example, selection of the directory name "Specific Product" may not be a complete path to a file. In this case, a window 120 (FIG. 9) may be displayed requesting a specific file name. The user enters an identifier in a file identifier box 122 and activates the OK button. The information entered through the file identifier box 122 may be easily customized via a configuration file.

Upon identification of a file, the contents of the file may be displayed in the content area 82. Since the image tab 112 is highlighted in the content area 82, images 128, 130, 132 within the file 11SKU#; 12345-1211 are retrieved and displayed within the content display area 126. To accommodate the reduced size of the content display area 126, the images may be reduced or enlarged using standard Java commands. Alternately, a thumbnail image may be displayed which may be suggestive of the underlying image.

Figure 11:
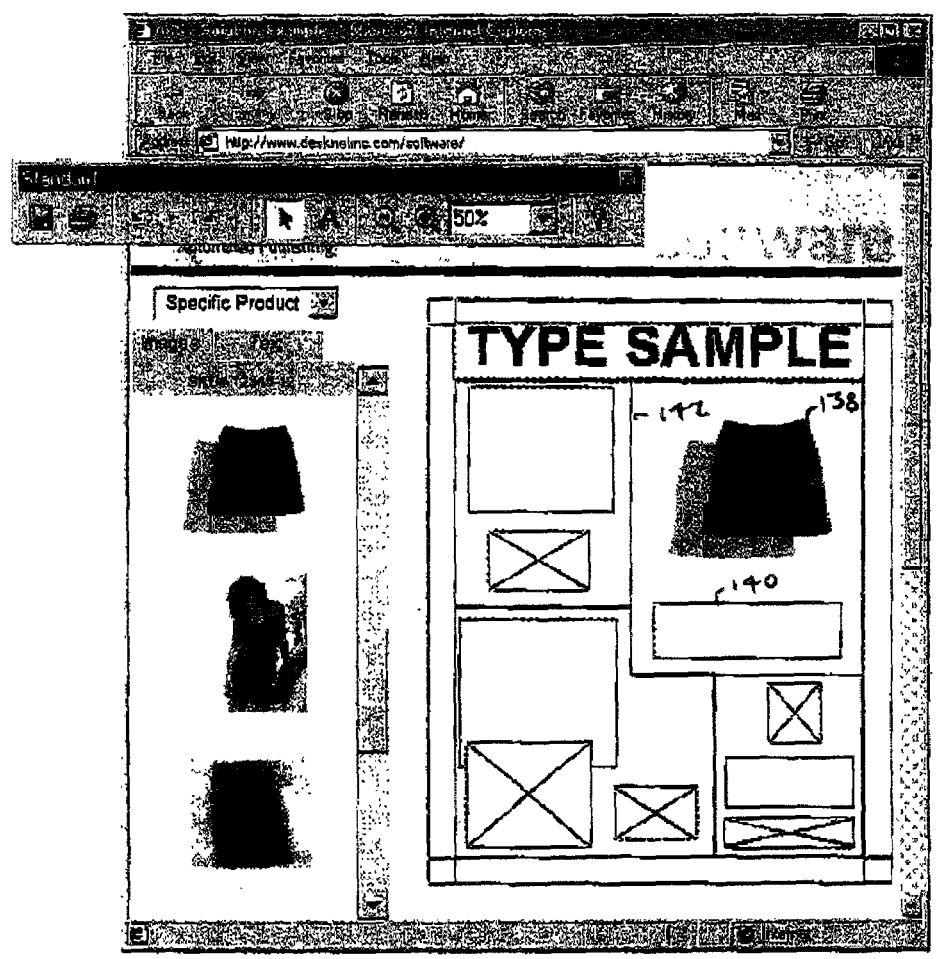
FIG. 11 depicts details of construction of the composite image constructed by the system of FIG. 1.

To create the composite image, the user may place a cursor 134 on an image (e.g., 128) and drag the image to a box (e.g., 136). When the cursor 134 is released, the 10 PBVB 30 resizes the image 128 to occupy the box 136 using standard Java commands. The outline of the box 136 disappears and the resized image 138 appears in its place (FIG. 11).

Since the image 138 was placed in a first box 136 of the larger box 142, the PBVB 30 may now assume that the second smaller box 140 is a text box. To select text to add to the composite image, the user may either click on the box 140 or select the text tab 114.

Figure 12:
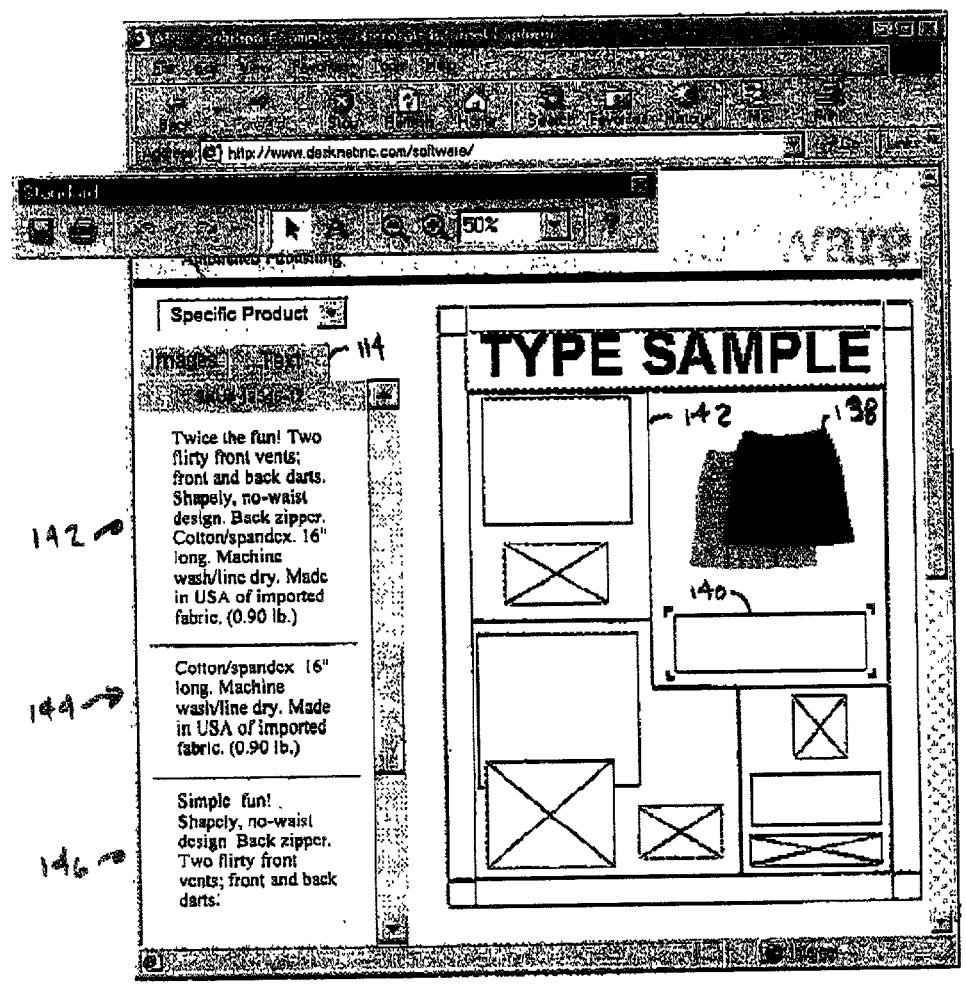
FIG. 12 depicts details of image transfer to the composite image constructed by the system of FIG. 1.
Figure 13:
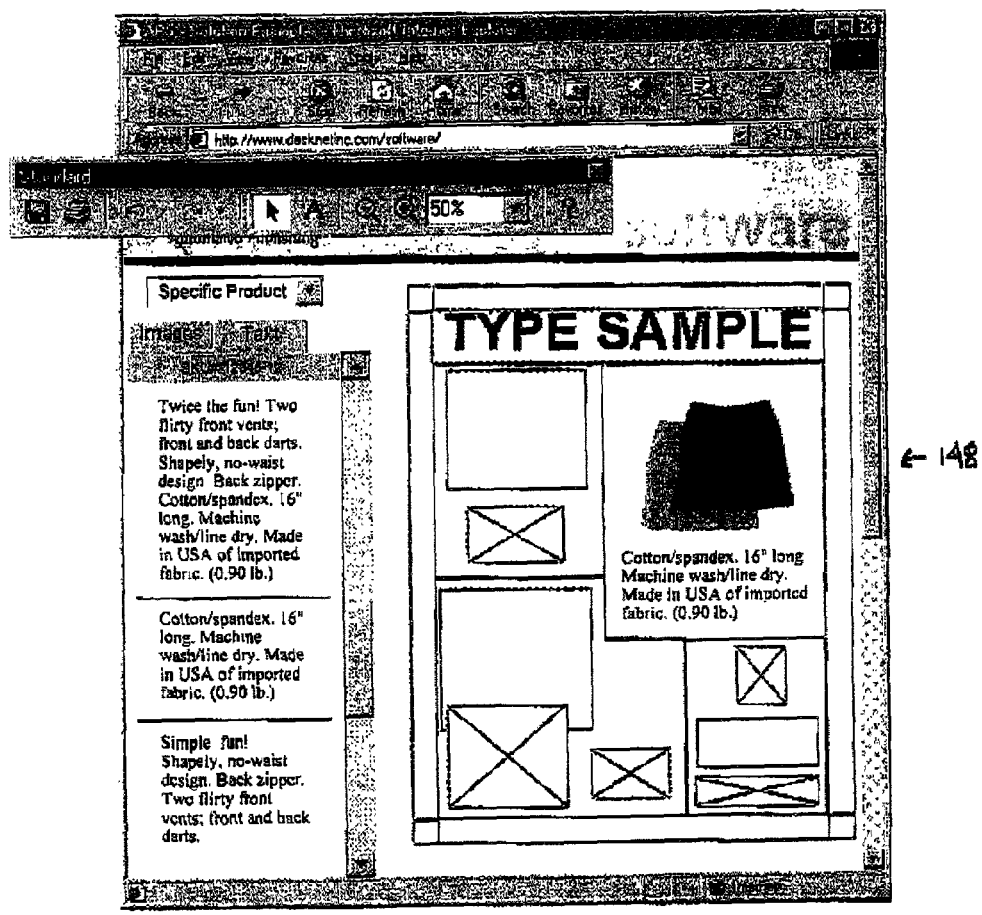
FIG. 13 depicts details the composite image constructed by the system of FIG. 1.

Selection of the text tab 114 (FIG. 12) causes any text sections 142, 144, 146 associated with the file to be presented in the content area 82. As with images, the user may place the cursor 134 over a text section and drag the text (e.g., 144) to a box (e.g., 140). Alternatively, the user may first click on the box 140 and then simply click on the text section 144 to affect a transfer. As with the images, the text section 144 may be resized to fit the box of the composite image (FIG. 13).

Once text has been dragged to a box the user may edit the text. Alternatively, the user may edit the text 144 file in the control area 82. The user may edit the text by selecting the text tool 98 or he may select the text by double-clicking on the text. Once the text tool has been selected, the user may place the cursor 134 in the proper location in the text and make any necessary changes.

Figure 14:
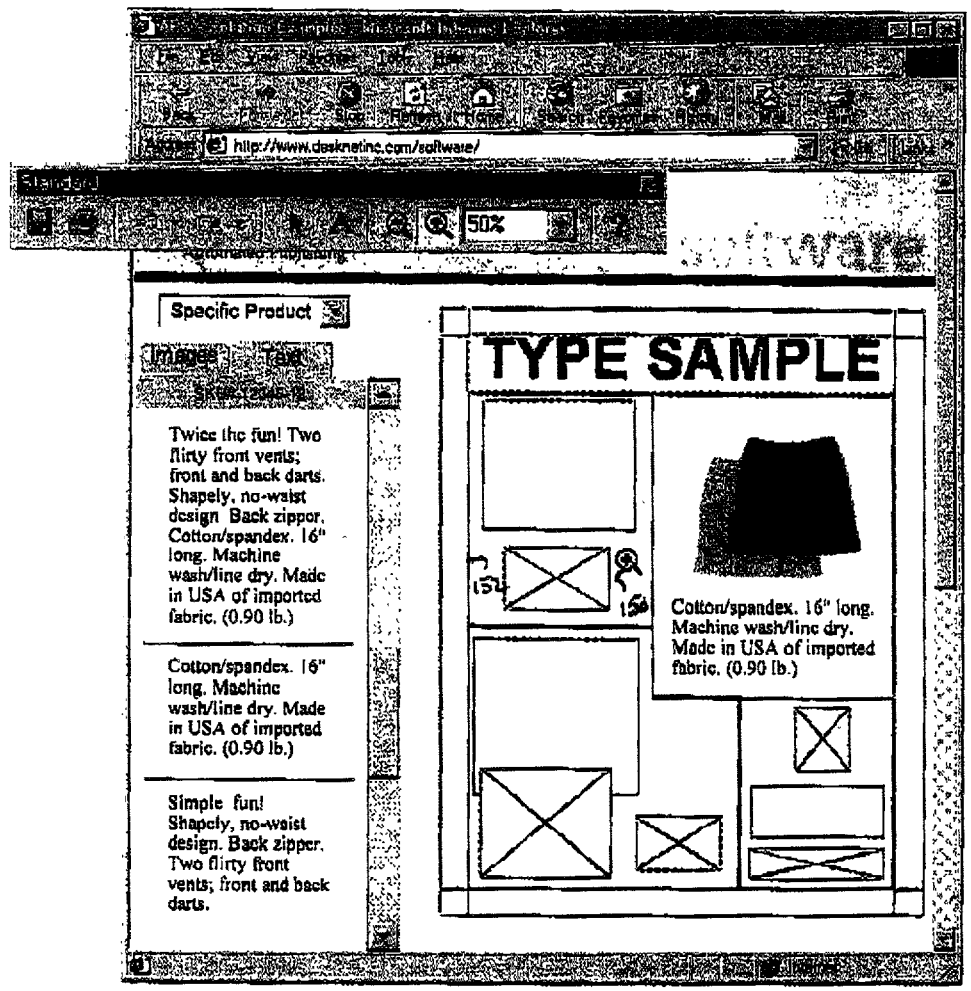
FIG. 14 depicts details of text transfer to the composite image constructed by the system of FIG. 1.
Figure 15:
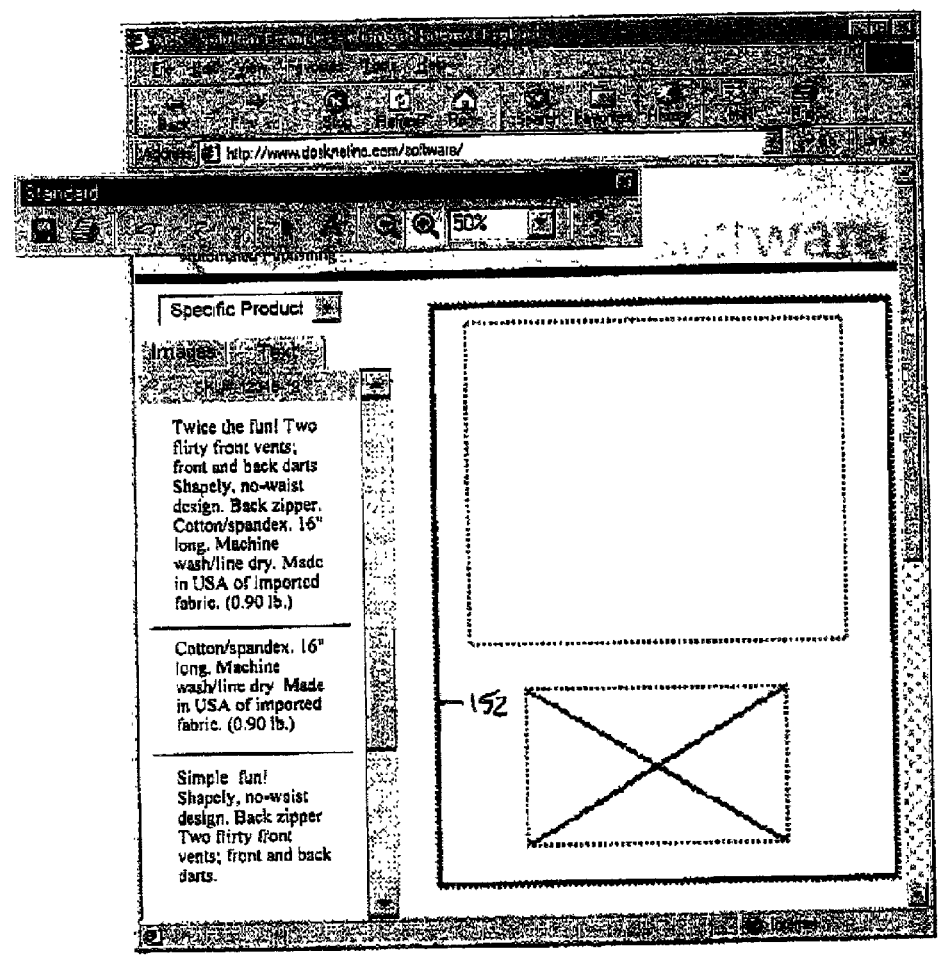
FIG. 15 depicts details of creation of the composite image constructed by the system of FIG. 1.

To facilitate entry of information into the composite image 148, the user may select the zoom-in tool 150 (FIG. 14) and enlarge a particular box 152. In response, the box 152 (FIG. 15) may be enlarged to occupy the entire right window. Image and text may be dragged and dropped as above. As each box 152 (FIG. 15) is completed, the user may return to the template by selecting the zoom-out tool 100.

Figure 16:
FIG. 16 depicts a composite image constructed by the system of FIG. 1.

Using the process described above, the entire composite image 148 may be completed as shown in FIG. 16. Upon completion, the user may select the save icon.

Upon selection of the save icon 88, the composite image 148 may be converted into an XML document and stored or printed. The XML document may be stored in a local database 22, transmitted under XML to a website 26 or stored in a remote database 24.

The transfer of data into and out of the PBVB 30 may be accomplished under any of a number of different formats. The source information (text and images) provided to the PBVB 30 may be provided under any appropriate mark-up language (e.g., XML) from any of a number of information conversion utilities (e.g., DeskNet APS). Images may be further encoded under an appropriate image format (e.g., gif, jpeg, etc.).

Composite images may be encoded by PBVB 30 into a composite image file 21, 29 under a webpage format for transmission, printing or storage in an appropriate database under a mark-up language structured to minimize composite file size, yet maximize file conversion efficiency. Appendix I provides an example of a document type definition (DTD) that may be used in conjunction with XML as an encoding mechanism for the composite image.

As may be noted from the DTD information of Appendix I, the information of the composite image maybe encoded under XML based upon position and any of a number of text and picture elements. The x position (xpos), y position (ypos) and width and height of each box of the original template of the composite image 148 is required. Text may be attached to text boxes using conventional XML formatting. Lines, font or shading may be imparted to the composite image 148 using the DTD and conventional XML formatting.

As may also be noted from the Appendix I the DTD allows images or text to be identified by a universal resource locator (URL). The utility of using a URL for an image (or for text) is that the actual image does not necessarily have to be stored within the composite image file. As such, the composite image file 21, 29 may simply be transferred in the form of a shell with references to source files. When the composite file reaches its destination, a browser may simply retrieve the information from the URL and insert it into the proper location of the composite image 148.

As is clear from Appendix I, the composite image file 21, 29 may be structured without any text or image information within the file. The composite image file 21, 29, in fact, need only contain a page layout with paths to the image and text necessary for rendering the composite image into the same visual appearance presented to the original user during creation of the composite image.

Within a destination (e.g., another CPU 16), the composite image 148 may be reconstructed based upon the composite image file 29 and the DTD 27. To recreate the composite image 148, a decoding processor 23 (e.g., a browser) may retrieve the composite image file 29 from a database 24. The decoding processor 23 may reconstruct the template using the composite image file 29 and DTD 27. Any images not contained within the file 29 may be retrieved using the URL within the composite image file 29.

FIG. 17 depicts an editing screen that may be generated by the PBVB tool 30 for editing composite screens. As with the composing screen of FIG. 6, the editing screen may include a content area 82 and an image area 84.

To facilitate editing of existing (or the generation of entirely new) composite images, the content area 82 may include tabs allowing selection of images, text or templates. In the case of the editing screen of FIG. 17, the template tab 160 may be used to retrieve pre-existing composite images.

By selecting the template tag (and entry of an appropriate path identifier), a number of previously created composite images 162, 164, 166 may be displayed in the context area 82. To select a composite image 162, 164, 166, the user may place the cursor over the image and activate the selection switch.

In response, the selected composite image 162, 164, 166 may be displayed in the image area 84. Once an image has been selected, the user may select the image or text tab (FIG. 17) and edit the selected composite image. Editing may occur by selecting the text tool and typing in corrections, add new boxes, change box size (all as described above), or substitute new content. New content may be substituted by dragging new content into the space of existing content. When this is done, the new content completely replaces the old content.

Turning now to the composite images, an example will now be provided regarding the structure and content of the composite image files 21, 29. Appendix II may be representative of a CEF file 21, 29 that may be generated by the PBVB tool 30 from the composite image 168 of FIG. 17.

For ease of understanding the content of Appendix II, line numbers have been added along the left margin of FIG. 17. Reference shall be made to the line numbers as appropriate to understanding the relationship between CEF files elements and corresponding elements of the composite image 168.

As may be noted, line 1 defines the type of CEF 21, 29 file by version and the term "encloding="linin1" defines an XML character set. Line 3 provides a URL to a relevant DTD 27, 31. Line 5 provides a layout delimiter. Line 6 provides a page number of the composite image and a size of the page in points (e.g., 72 points per inch).

Lines 7–18 defines the first element 170 of the composite image 168. As shown on line 7, the element 170 is a text box. The x and y position (i.e., xpos and ypos) of the upper left corner of the box lies at 225 and 643.252, respectively. The width is 365.7266 and the height is 21.2385 points. The box can be edited, therefore canEdit="true". The term xpos=0, therefore other boxes may overlap the first element 170. The runaround terms (e.g., runaroundleft, runaroundright, runaroundtop, runaroundbottom) specify a border space around the element 170. Line 12 defines the end of the text properties. Lines 13–15 specify font and style. Lines 16–17 specifies the actual text to be placed within the element 170. Line 18 defines the end of the text element 170.

Lines 20–27 defines the location and content of a picture box 172. As may be noted, line 26 provides a URL to the actual image information to be inserted into the picture box 172.

Similarly, lines 28–35 defines image element 196 and lines 36–47 defines text box 182. Line 48 to the end of page 1 and lines 1–6 on page 2 of Appendix II define text box 184. Lines 8–19 defines empty box 178, lines 20–27 defines image element 174 and lines 28–35 defines picture box 180.

Line 36 to the end of page 2 and lines 1–9 of page 3 of Appendix II defines the location and content of large text box 188. Lines 10–21 defines text box 188, lines 22–33 defines text box 190, lines 34–45 defines text box 192. Line 42 to the end of page 2 and lines 1–11 on page 4 defines text box 186.

It should be noted that elements 172 and 174 have a lower zpos value than elements 188. The lower zpos values of elements 172 and 174 identify these elements as lying on top of (instead of underneath) element 188.

A specific embodiment of a method and apparatus for constructing composite images according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of constructing a composite image within an image space of a webpage, such method comprising:
   displaying a plurality of source contents within a content area of the webpage;
   dividing the image space of the composite image into a plurality of subspaces;
   designating a subspace in three dimensions of the plurality of subspaces for receipt of a selected content of the plurality of source contents; and
   resizing the selected content to fit the designated subspace of the composite image,
   wherein the resizing takes place automatically and without a user's intervention.

2. The method of constructing a composite image as in claim 1 further comprising using a mark-up language to encode the composite image.

3. The method of constructing a composite image as in claim 1 further comprising displaying the resized content in the designated subspace.

4. The method of constructing a composite image as in claim 3 further comprising displaying a plurality of text images within the content area.

5. The method of constructing a composite image as in claim 4 further comprising designating a subspace in three dimensions of the plurality of subspaces for receipt of a selected text image of the plurality of text images.

6. The method of constructing a composite image as in claim 5 further comprising resizing the selected text image of the plurality of text images to fit the designated subspace.

7. The method of constructing a composite image as in claim 6 further comprising displaying the resized text image in the designated subspace.

8. The method of constructing a composite image as in claim 7 wherein the step of displaying the text image within the designated subspace further comprises editing a content of the text image within the designated space.

9. The method of constructing a composite image as in claim 8 further comprising dividing a subspace of the plurality of subspaces into a text area and an image area.

10. The method of constructing a composite image as in claim 9 wherein the step of designating the subspace further comprises dragging a text image of the plurality of text images to the text area of the divided subspace.

11. The method of constructing a composite image as in claim 9 wherein the step of designating the subspace further comprises dragging a source image of the plurality of source images to the image area of the divided subspace.

12. The method of constructing a composite image as in claim 6 wherein the step of displaying the plurality of text images within the content area further comprises editing text within a text image of the plurality of text images.

13. The method of constructing a composite image as in claim 1 further comprising disposing lines around a subspace of the plurality of subspaces.

14. An apparatus for constructing a composite image within an image space of a webpage, such method comprising:
   means for displaying a plurality of source contents within a content area of the webpage;
   means for dividing the image space of the composite image into a plurality of subspaces;
   means for designating a subspace in three dimensions of the plurality of subspaces for receipt of a selected content of the plurality of source contents; and
   means for resizing the selected content to fit the designated subspace of the composite image,
   wherein the resizing takes place automatically and without a user's intervention.

15. The apparatus for constructing a composite image as in claim 14 further comprising means for using a mark-up language to encode the composite image.

16. The apparatus for constructing a composite image as in claim 15 further comprising means for displaying a plurality of text images within the content area.

17. The apparatus for constructing a composite image as in claim 16 further comprising means for designating a subspace in three dimensions of the plurality of subspaces for receipt of a selected text image of the plurality of text images.

18. The apparatus for constructing a composite image as in claim 17 further comprising means for resizing the selected text image of the plurality of text images to fit the designated space.

19. The apparatus for constructing a composite image as in claim 18 further comprising means for displaying the resized text image in the designated subspace.

20. The apparatus for constructing a composite image as in claim 19 wherein the means for displaying the text image within the designated subspace further comprises means for editing a content of the text image within the designated space.

21. The apparatus for constructing a composite image as in claim 20 further comprising means for designating a subspace in three dimensions of the plurality of sub spaces into a text area and an image area.

22. The apparatus for constructing a composite image assign claim 21 wherein the means for designating the subspace further comprises means for dragging a text image of the plurality of text images to the text area of the divided subspace.

23. The apparatus for constructing a composite image as in claim 21 wherein the means for designating the subspace further comprises means for dragging a source image of the plurality of source images to the image area of the divided subspace.

24. The apparatus for constructing a composite image as in claim 18 wherein the means for displaying the plurality of text images within the content area further comprises means for editing text within a text image of the plurality of text images.

25. The apparatus for constructing a composite image as in claim 14 further comprising means for displaying the resized content in the designated subspace.

26. The apparatus for constructing a composite image as in claim 14 further comprising means for disposing lines around a subspace of the plurality of subspaces.

27. An apparatus for constructing a composite image within an image space of a webpage, such method comprising:
   a webpage adapted to display a plurality of source contents within a content area of the webpage;
   means for dividing the image space of the composite image into a plurality of subspaces;
   means for designating a subspace in three dimensions of the plurality of subspaces for receipt of a selected content of the plurality of source contents; and
   means for resizing the selected content to fit the designated subspace of the composite images,
   wherein the resizing takes place automatically and without a user's intervention.

28. The apparatus for constructing a composite image as in claim 27 further comprising means for using a mark-up language to encode the composite image.

29. The apparatus for constructing a composite image as in claim 28 further comprising means for displaying a plurality of text images within the content area.

30. The apparatus for constructing a composite image as in claim 29 further comprising means for designating a subspace in three dimensions of the plurality of subspaces for receipt of a selected text image of the plurality of text images.

31. The apparatus for constructing a composite image as in claim 30 further comprising means for resizing the selected text image of the plurality of text images to fit the designated space.

32. The apparatus for constructing a composite image as in claim 31 further comprising means for displaying the resized text image in the designated subspace.

33. The apparatus for constructing a composite image as in claim 32 wherein the means for displaying the text image within the designated subspace further comprises means for editing a content of the text image within the designated space.

34. The apparatus for constructing a composite image as in claim 33 further comprising means for dividing a subspace of the plurality of subspaces into a text area and an image area.

35. The apparatus for constructing a composite image as in claim 34 wherein the means for designating the subspace further comprises means for dragging a source image of a plurality of source images to the image area of the divided subspace.

36. The apparatus for constructing a composite image as in claim 32 wherein the means for designating the subspace further comprises means for dragging a text image of the plurality of text images to the text area of the divided subspace.

37. The apparatus for constructing a composite image as in claim 31 wherein the means for displaying the plurality of text images within the content area further comprises means for editing text within a text image of the plurality of text images.

38. The apparatus for constructing a composite image as in claim 27 further comprising means for displaying the resized image in the designated subspace.

39. The apparatus for constructing a composite image as in claim 27 further comprising means for disposing lines around a subspace of, the plurality of subspaces.

* * * * *